(12) United States Patent
Jaradi et al.

(10) Patent No.: US 10,710,548 B2
(45) Date of Patent: Jul. 14, 2020

(54) SEATBELT GUIDE ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 98 days.

(21) Appl. No.: 15/954,660

(22) Filed: Apr. 17, 2018

(65) Prior Publication Data

US 2019/0315310 A1  Oct. 17, 2019

(51) Int. Cl.
*B60R 22/18* (2006.01)
*B60R 22/24* (2006.01)
*B60R 21/00* (2006.01)

(52) U.S. Cl.
CPC ...... *B60R 22/24* (2013.01); *B60R 2021/0009* (2013.01); *B60R 2022/1818* (2013.01)

(58) Field of Classification Search
CPC . B60R 2022/1818; B60R 22/24; B60R 22/32; B60R 22/321; B60R 22/322; B60R 22/324; B60R 22/327
See application file for complete search history.

(56) References Cited

U.S. PATENT DOCUMENTS

| | | | |
|---|---|---|---|
| 4,371,193 A | 2/1983 | Takada | |
| 5,054,815 A * | 10/1991 | Gavagan | B60R 22/19 188/65.1 |
| 6,467,850 B1 | 10/2002 | Kawai et al. | |
| 8,807,598 B2 | 8/2014 | Strnad et al. | |
| 9,090,225 B2 * | 7/2015 | Rouhana | B60R 22/28 |
| 9,126,555 B2 * | 9/2015 | Ver Hoven | B60R 22/1954 |
| 10,011,245 B2 * | 7/2018 | Wang | B60R 22/10 |
| 2007/0138783 A1 | 6/2007 | Gleason et al. | |
| 2013/0062925 A1 * | 3/2013 | Hori | B60R 22/00 297/468 |
| 2017/0369029 A1 * | 12/2017 | Loew | B60R 22/20 |
| 2019/0039561 A1 * | 2/2019 | Kizil | B60R 22/18 |

FOREIGN PATENT DOCUMENTS

GB   2388084 A   11/2003
WO   2007071522 A1   6/2007

\* cited by examiner

*Primary Examiner* — Ruth Ilan
(74) *Attorney, Agent, or Firm* — Frank A. Mackenzie; Bejin Bieneman PLC

(57) ABSTRACT

An assembly includes a seatbelt guide. The seatbelt guide includes a slot. A webbing extends through the slot. A releasable post is supported by the seatbelt guide and extends across the slot. The releasable post releases during a vehicle impact to allow the webbing to move along the slot to reduce chest deflection of an occupant during the vehicle impact.

23 Claims, 8 Drawing Sheets

SEATBELT GUIDE ASSEMBLY

BACKGROUND

The seatbelt portion of a vehicle restraint system secures the occupant of a vehicle against harmful movement that may result from a vehicle collision. The seatbelt functions to reduce the likelihood of injury by reducing the force of occupant impacts with vehicle interior structures. In this role, the seatbelt applies loads across the chest or lap of the occupant. Chest deflection resulting from these loads may be measured by a test device for human occupant restraint (THOR) in tests for the U.S. New Car Assessment Program (USNCAP). The THOR includes sensors that chest deflection. Controlling or reducing these loads may reduce the risk of occupant injury during a collision.

DETAILED DESCRIPTION

Figure 1A:
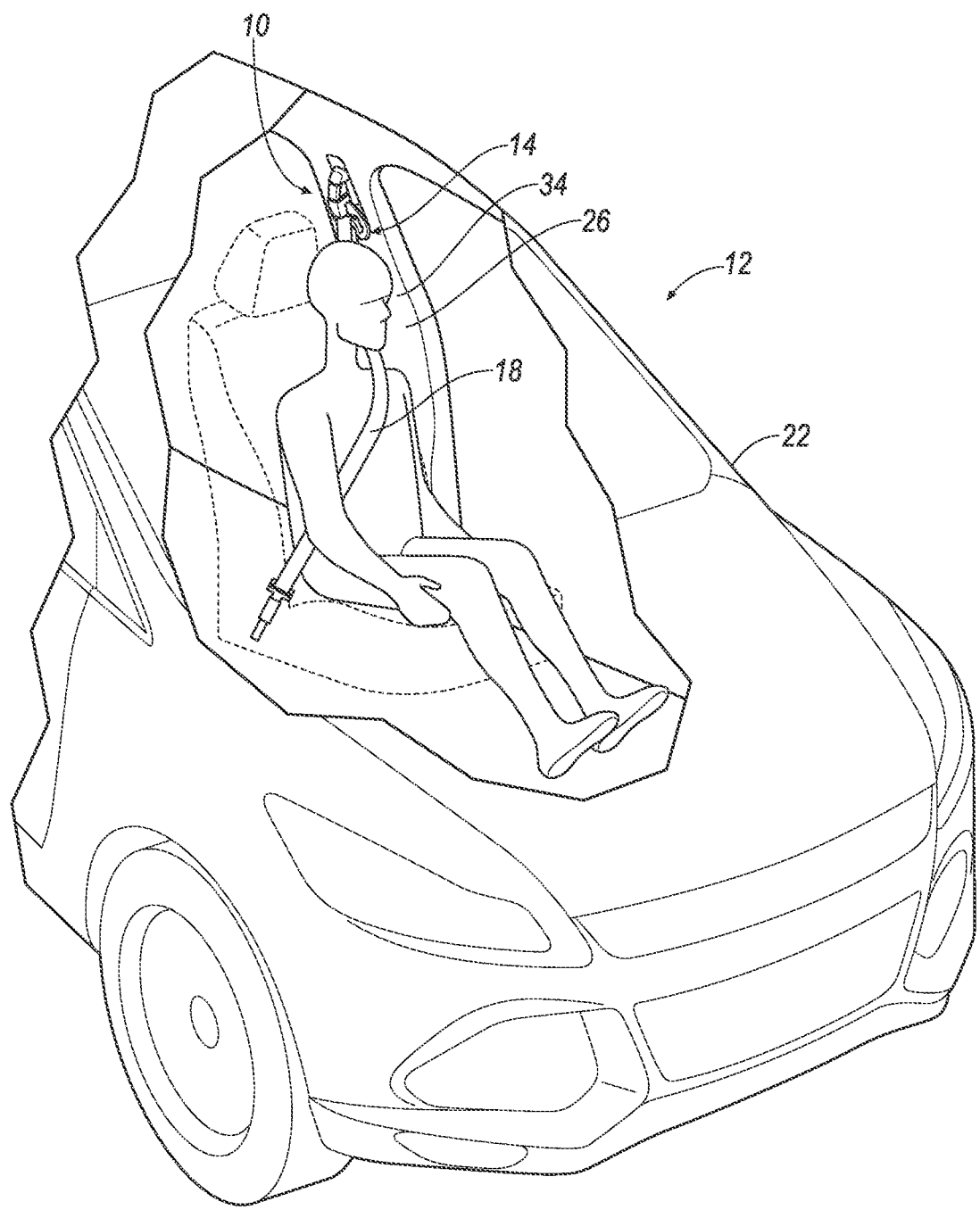
FIG. 1A is a perspective view of a vehicle with a seatbelt guide assembly and the webbing in a first position.

An assembly includes a seatbelt guide. The seatbelt guide includes a slot. A webbing extends through the slot. A releasable post is supported by the seatbelt guide and extends across the slot.

The releasable post may be frangible relative to the seatbelt guide.

The releasable post may have a joint connecting the releasable post to the seatbelt guide and the joint may be frangible relative to the seatbelt guide.

The releasable post and the seatbelt guide may be monolithic.

The assembly may include a spring between the seatbelt guide and the releasable post.

The seatbelt guide may have a cavity. The cavity may house the spring.

The spring may bias the releasable post away from the cavity.

The releasable post may be retractable into the cavity.

The assembly may include a solenoid supported by the seatbelt guide. The solenoid may include the releasable post.

The assembly may include a processor and a memory. The memory stores program instructions executable by the processor to actuate the solenoid to retract the releasable post relative to the slot as a result of a detection of an oblique impact.

The slot may have a first segment and a second segment. The releasable post separates the first segment of the slot from the second segment of the slot. The first segment of the slot and the second segment of the slot are elongated from the releasable post.

The first segment of the slot may be elongated along a first axis, and the second segment of the slot may be elongated along a second axis transverse to the first axis.

The second axis may extend from the first axis in a vehicle-inboard direction.

The second axis may extend from the first axis in a downward direction.

The second axis may extend from the first axis in the downward direction and in the vehicle-inboard direction.

The seatbelt guide may have a first portion. The first portion defines the first segment of the slot and extends along the first axis. The seatbelt guide may have a second portion. The second portion defines the second segment of the slot and extends along the second axis.

With reference to the Figures, wherein like numerals indicate like parts throughout the several views, an assembly 10 for a vehicle 12 includes a seatbelt guide 14. The seatbelt guide 14 includes a slot 16. A webbing 18 extends through the slot 16. A releasable post 20 is supported by the seatbelt guide 14 and extends across the slot 16.

Figure 1B:
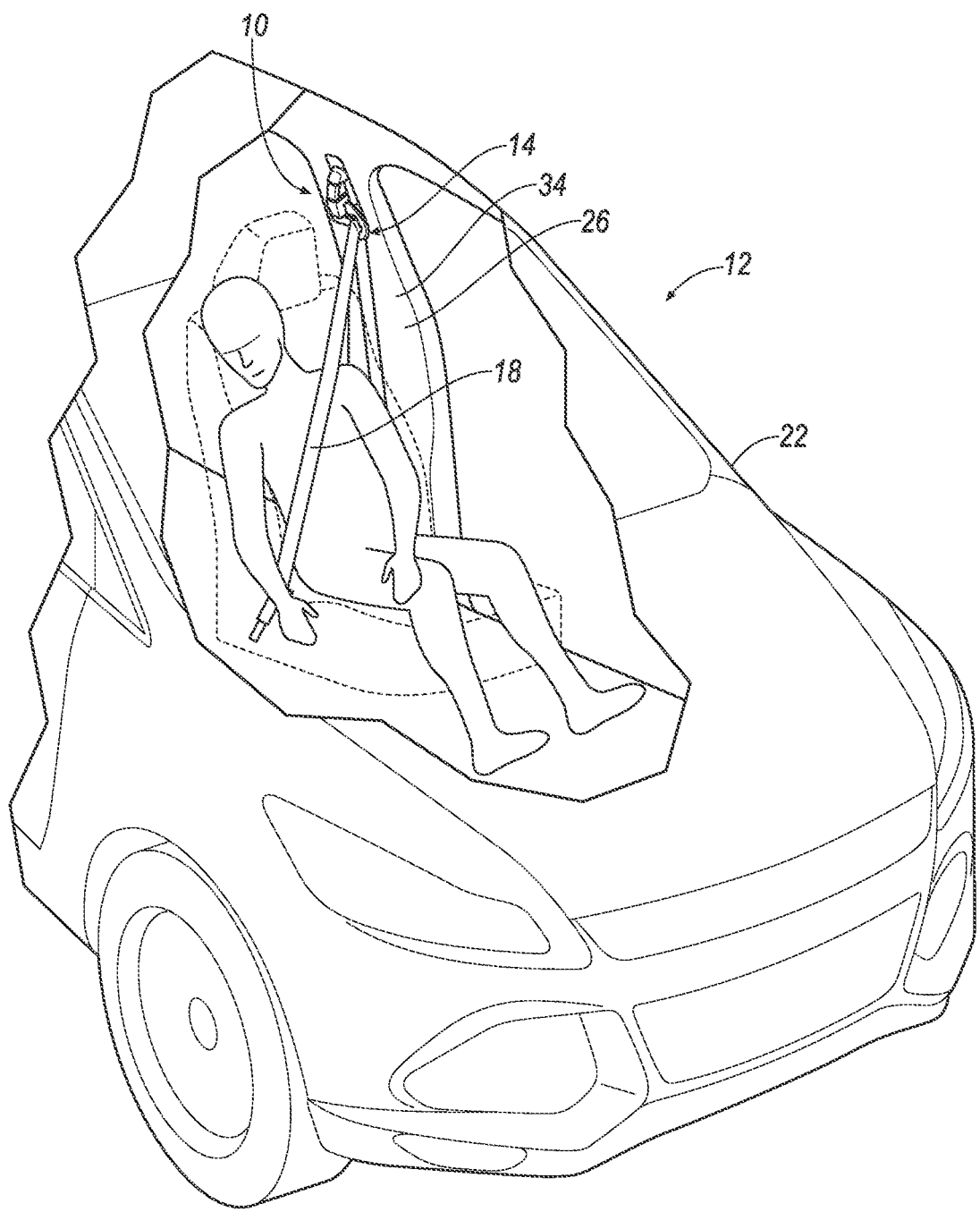
FIG. 1B is a perspective view of a vehicle with the seatbelt guide assembly and the webbing in a second position.
Figure 3A:
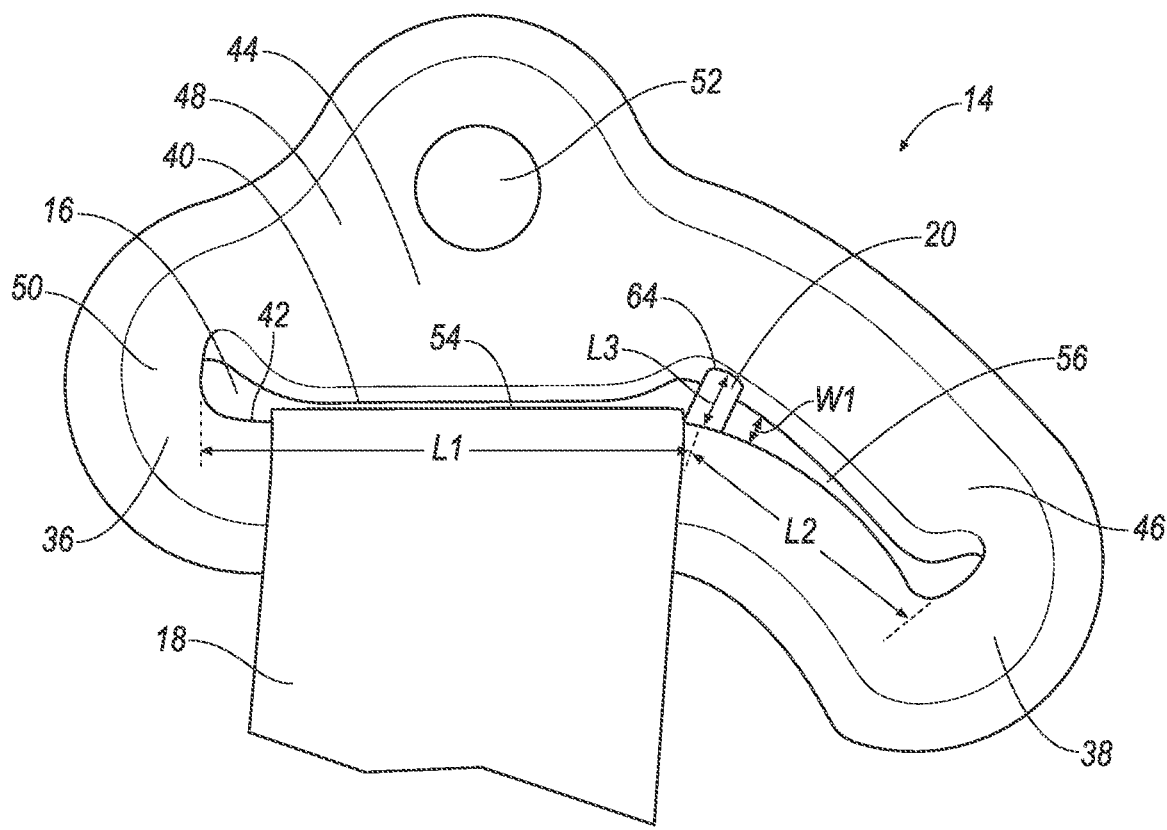
FIG. 3A is a perspective view of the seatbelt guide assembly including the webbing in the first position and the releasable post.
Figure 3B:
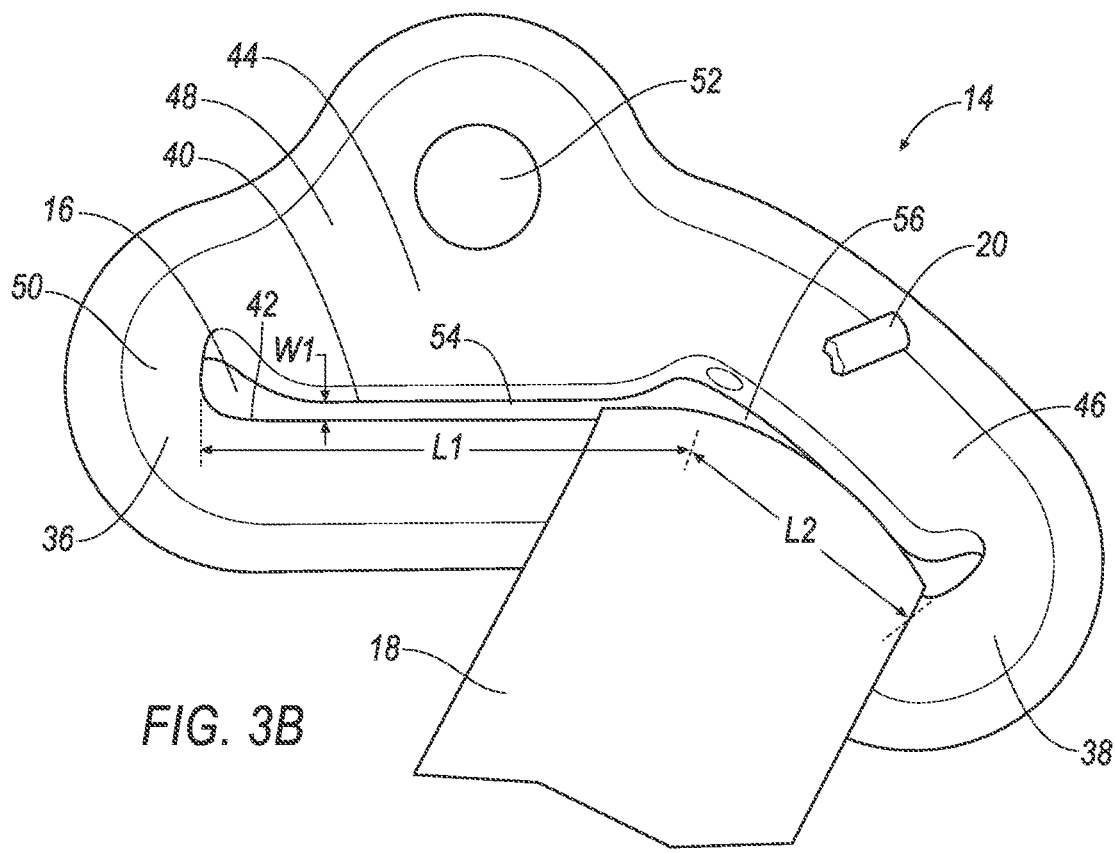
FIG. 3B is a perspective view of the seatbelt guide assembly including the webbing in the second position and the releasable post released.
Figure 4A:
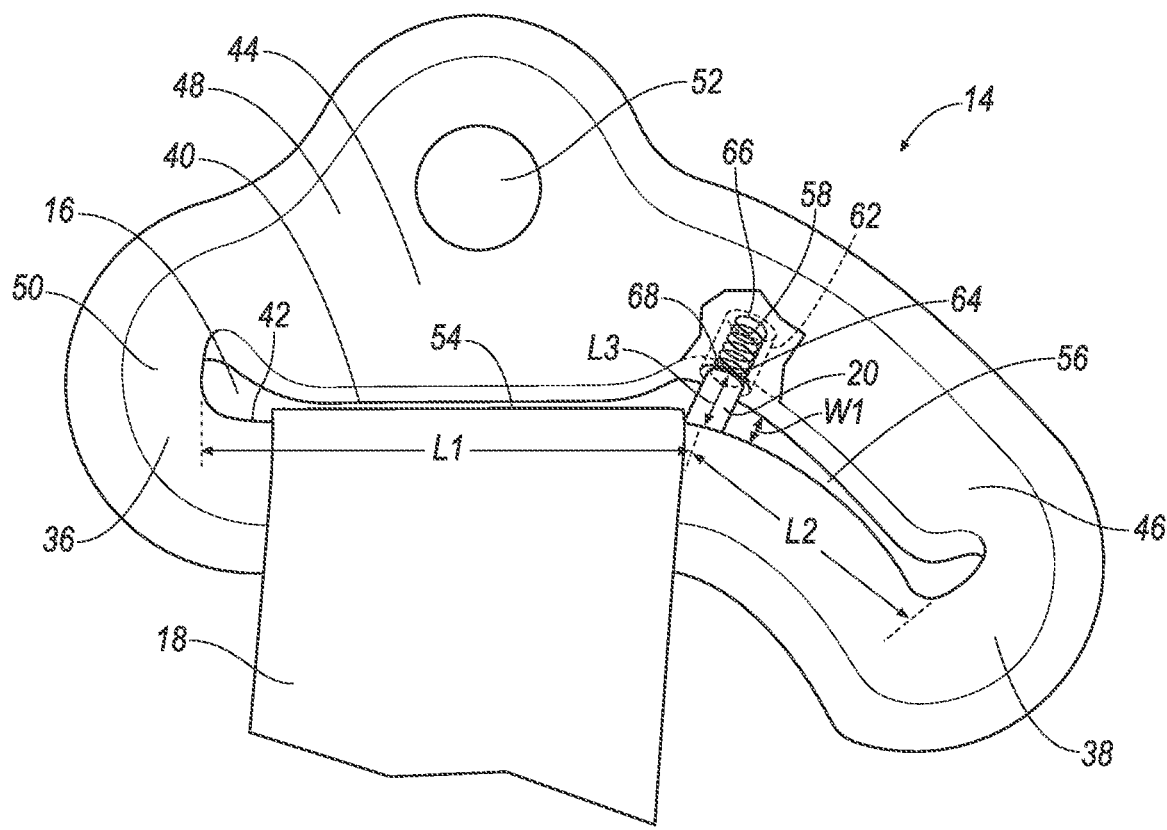
FIG. 4A is a perspective view of the seatbelt guide assembly including the webbing in the first position, the releasable post and a spring.

The seatbelt guide 14 allows the webbing 18 to move along the slot 16 of the seatbelt guide 14 in response to an impact of the vehicle 12 to reduce chest deflection of an occupant during the vehicle impact. Specifically, the seatbelt guide 14 allows the webbing 18 to move in the slot 16 from a first position, as shown in FIGS. 3A, 4A, and 5A, to a second position, as shown in FIGS. 3B, 4C, and 5B, in response to the impact of the vehicle 12. As one example, as shown in FIG. 1B, the seatbelt guide 14 allows the webbing 18 to move along the slot 16 in response to an oblique impact of the vehicle 12. In the example shown in FIG. 1B, the oblique impact may be on the right side of the vehicle. During such an oblique impact, the occupant of the driver seat is biased in a vehicle-forward and vehicle-inboard direction, which loads forces on the chest of the occupant and biases the webbing 18 in the vehicle-forward and vehicle-inboard direction. This biases the webbing 18 against the releasable post 20, causing the releasable post 20 to release and allowing the webbing 18 to slide from the first position, as shown in FIGS. 3A, 4A, and 5A, to the second position, as shown in FIGS. 3B, 4C, and 5B. The movement of the webbing 18 from the first position to the second position reduces loading on the chest of the occupant and the resulting chest deflection. For example, this reduction in loading can be measured by a test device for human occupant restraint (THOR) in tests for the U.S. New Car Assessment Program (USNCAP). As another example, the oblique impact may be on the left side of the vehicle, in which the occupant of the driver seat is biased in a vehicle-forward and vehicle-outboard direction, which biases the webbing 18 against the releasable post 20, causing the releasable post 20 to release and allowing the webbing to slide from the first position to the second position. When located at the front passenger seat or rear seats, the seatbelt guide 14 similar to that described above. As another example, the seatbelt guide 14 allows the webbing 18 to move along the slot 16 in response to a frontal impact of the vehicle 12, in which the occupant is biased in a vehicle-forward direction, causing the releasable post 20 to release.

The vehicle 12 may be any suitable type of vehicle, e.g., an automobile, including a sedan, a pick-up truck, a sport-utility vehicle, etc. As shown in FIGS. 1A-1B, the vehicle 12 includes a passenger cabin (not numbered) to house occupants, if any, of the vehicle 12.

The vehicle 12 may include a body 22. The body 22 may be of any suitable construction, e.g., a unibody construction, body-on-frame construction, etc. The body 22 may be formed of any suitable material, for example, steel, aluminum, carbon fiber, etc.

The body 22 includes pillars 26 that support other vehicle components, e.g., a roof (not shown), a door (not shown), the seatbelt guide 14, etc. The pillar 26 may include a panel (not numbered), e.g., an inner panel and an outer panel fixed to each other, and a trim cover 34. The panel provides support to the trim cover 34 and the seatbelt guide 14, etc. The panel may be steel, aluminum, carbon fiber, or any other suitable material. The panel, e.g., the outer panel, may include a class-A surface on an exterior of the vehicle 12. The trim cover 34 may include a class-A surface in the passenger cabin. The trim cover 34 may be plastic or any other suitable material.

The vehicle 12 may include any suitable number of assemblies 10, e.g., an assembly 10 for each occupant. In other words, the assembly 10 may be located at any suitable location for use by an occupant. As an example, the assembly 10 is shown in the figures for use with an occupant on the left side of the vehicle 12. When used with an occupant on the right side of the vehicle 12, the seatbelt guide 14 may be a mirror image of that shown in FIGS. 1A-1B.

With reference to FIGS. 1A-1B, the seatbelt guide 14 may be supported by the pillar 26. Alternatively, the seatbelt guide 14 may be supported by any suitable component of the vehicle 12. The seatbelt guide 14 may be metal, plastic, etc., including combinations thereof. The seatbelt guide 14 may be hollow or solid.

With reference to FIG. 3A, the seatbelt guide 14 has a first end 36 and a second end 38. The slot 16 may extend from the first end 36 of the seatbelt guide 14 to the second end 38 of the seatbelt guide 14. Additionally, the seatbelt guide 14 has an upper surface 40 above the slot 16 and a lower surface 42 below the slot 16.

With reference to FIGS. 2A-5B, the seatbelt guide 14 has a first portion 44 and a second portion 46 transverse to the first portion 44. As shown in the Figures, the second portion 46 may extend from the first portion 44 downwardly and in a vehicle-forward and vehicle-inboard direction. The first portion 44 may be adjacent the second portion 46. In other words, the first portion 44 and the second portion 46 extend directly from each other. Alternatively, an intermediate portion (not numbered) may be disposed between the first portion 44 and the second portion 46.

Figure 2A:
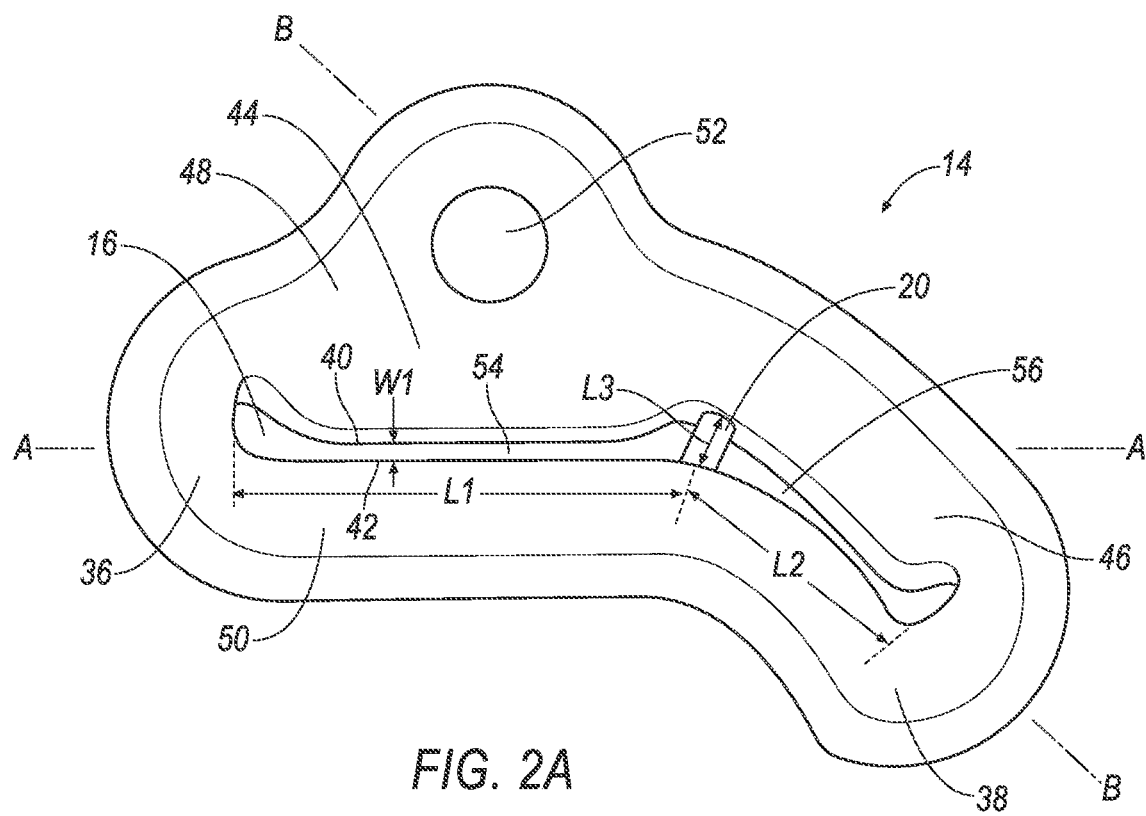
FIG. 2A is a perspective view of the seatbelt guide assembly including a releasable post.
Figure 2B:
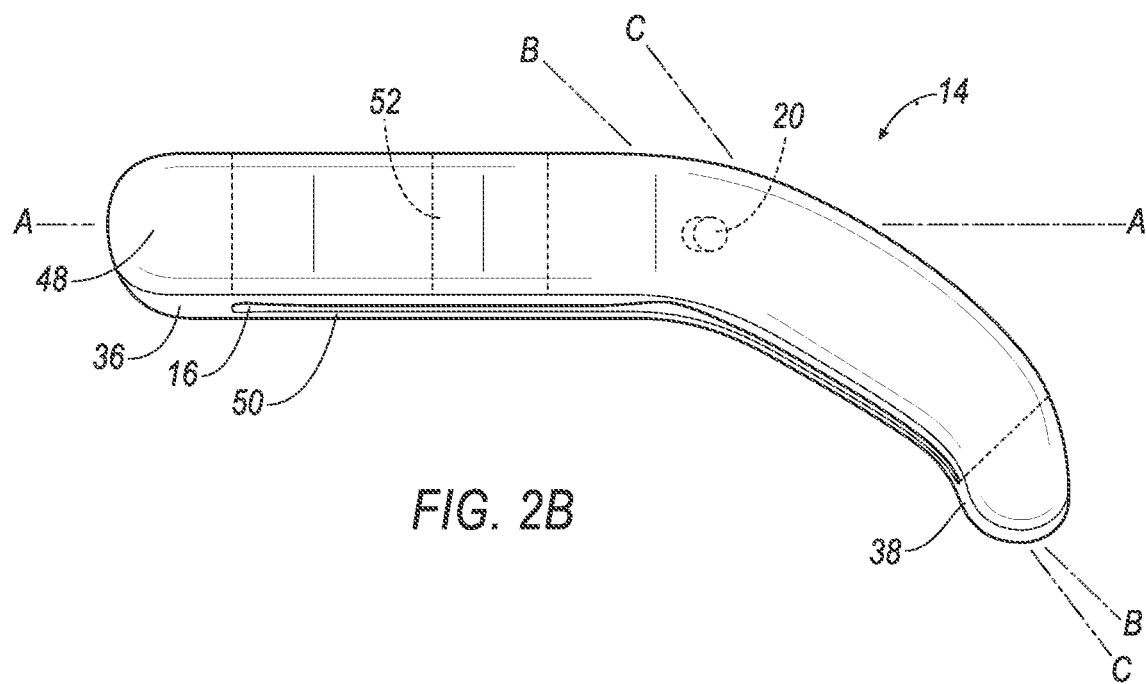
FIG. 2B is a top view of the seatbelt guide assembly.

The first portion 44 and/or the second portion 46 may curve at the juncture of the first portion 44 and the second portion 46, as shown in FIG. 2B. In such a configuration, the curve between the first portion 44 and the second portion 46 may be at a radius that reduces the likelihood that the webbing 18 puckers at the curve. As another example, the second portion 46 may be at an angle at the first portion 44.

With reference to FIG. 2A, the first portion 44 has an upper section 48 and a lower section 50. The lower section 50 projects forward relative to the upper section 48, as shown in FIG. 2B. With further reference to FIG. 2A, the upper section 48 of the seatbelt guide 14 defines a hole 52 above the slot 16. The seatbelt guide 14 may be mounted through the hole 52 to the inner panel in any suitable fashion, e.g., with a fastener such as a bolt, etc. The seatbelt guide 14 may be mounted such that the seatbelt guide 14 is fixed relative to the pillar 26. Alternatively, the seatbelt guide 14 may be mounted such that the seatbelt guide 14 can pivot relative to the pillar 26.

The slot 16 is elongated between the first end 36 of the seatbelt guide 14 and the second end 38 of the seatbelt guide 14. The slot 16 includes a first segment 54 and a second segment 56 separated from each other by the releasable post 20.

With reference to FIGS. 2A-2B, the first segment 54 extends along and is elongated along a first axis A, and the second segment 56 extends along and is elongated along a second axis B transverse to the first axis A. With reference to FIGS. 1A-2B, the first axis A may extend in a vehicle fore-and-aft direction. The first axis A may be generally horizontal. With reference to FIG. 2A, the second axis B may extend downwardly from the first axis A. With reference to FIG. 2B, the second axis B may extend from the first axis A in a vehicle-forward and vehicle-inboard direction. In the example, shown in FIGS. 1A-2B, the first axis A is generally horizontal and extends in a vehicle fore-and-aft direction, and the second axis B extends from the first axis A downwardly and in a vehicle-forward and vehicle-inboard direction. In this configuration, in the event the releasable post 20 is released from the seatbelt guide 14, the webbing 18 slides along the seatbelt guide 14 from the first segment 54 to the second segment 56 downwardly and in a vehicle-forward and vehicle-inboard direction to the second end 38 of the seatbelt guide 14, as shown in FIG. 1B, to relieve forces of the webbing 18 on the chest of the occupant.

The first segment 54 of the slot 16 may be entirely on the first portion 44 of the seatbelt guide 14, and the second segment 56 of the slot 16 may be entirely on the second portion 46 of the guide. In such an example, the releasable post 20 is in the slot 16 at the juncture of the first portion 44 and the second portion 46. Alternatively, the first segment 54 of the slot 16 may extend partially onto the second portion 46 of the seatbelt guide 14, or the second segment 56 of the slot 16 may extend partially onto the first portion 44 of the seatbelt guide 14.

The first segment 54 has a first length L1, e.g., between the first end 36 of the seatbelt guide 14 and the releasable post 20. The second segment 56 has a second length L2, e.g., between the second end 38 of the seatbelt guide 14 and the releasable post 20. In the example shown in the Figures, the second length L2 is less than the first length L1. As another example, the second length L2 may be equal to the first length L1.

The slot 16 has a width W1 that extends from the upper surface 40 of the seatbelt guide 14 to the lower surface 42 of the seatbelt guide 14. The width W1 of the slot 16 may vary along the first length L1 and the second length L2. In other words, the slot 16 may have varying widths W1 from the first end 36 of the seatbelt guide 14 through the releasable post 20 to the second end 38 of the seatbelt guide 14.

The releasable post 20 is supported by the seatbelt guide 14. With reference to FIGS. 2A, 3A, 4A, and 5A, the releasable post 20 is located between the first segment 54 and the second segment 56. The releasable post 20 extends across the slot 16, from the upper surface 40 of the seatbelt guide 14 to the lower surface 42 of the seatbelt guide 14. In other words, the releasable post 20 is positioned in the slot 16 to retain the webbing 18 in the first segment 54 prior to release of the releasable post 20 from the seatbelt guide 14. As an example, the releasable post 20 may be in contact with both the upper surface 40 of the seatbelt guide 14 and the lower surface 42 of the seatbelt guide 14. With further reference to FIGS. 2A, 3A, 4A, and 5A, the releasable post 20 extends the width W1 of the slot 16. The releasable post 20 may have a third length L3 which is longer than the width W1 of the slot 16.

The seatbelt guide 14 may have a cavity 62 that houses the releasable post 20. In one example and as shown in FIGS. 4A-5B, the cavity 62 may be located in the upper surface 40 of the seatbelt guide 14. In another example, the cavity 62 may be located in the lower surface 42 of the seatbelt guide 14. The cavity 62 may be sized to receive the releasable post 20.

As set forth above, the releasable post 20 is releasable from the seatbelt guide 14 to allow the webbing 18 to move from the first segment 54 of the slot 16 to the second segment 56 of the slot 16. For example, in one embodiment shown in FIGS. 3A-3B, the releasable post 20 is frangible relative to the seatbelt guide 14, and the releasable post 20 breaks away from the seatbelt guide 14 to allow the webbing 18 to move to the second segment 56 of the slot 16 as a result of forces from a vehicle impact. As another example, in the embodiment shown in FIGS. 4A-4C, the releasable post 20 may be spring-loaded on the seatbelt guide 14, and a spring force on the releasable post 20 is overcome as a result of forces from a vehicle impact to allow the webbing 18 to move to the second segment 56 of the slot 16. As another example, as shown in FIGS. 5A-5B, the releasable post 20 may be a component of a solenoid 60, and the solenoid 60 may retract the releasable post 20 from the slot 16 in response to a sensed vehicle impact to allow the webbing 18 to move to the second segment 56 of the slot 16.

With reference to FIGS. 3A-3B, the releasable post 20 may be frangible relative to the seatbelt guide 14. In other words, the releasable post 20 may be break away from the seatbelt guide 14 at any point along the third length L3 of the releasable post 20. As shown in FIG. 3B, when the releasable post 20 releases from the seatbelt guide 14, the releasable post 20 allows the webbing 18 to glide across the lower surface 42 of the seatbelt guide 14 from the first segment 54 to the second segment 56.

The releasable post 20 may have a joint 64 connecting the releasable post 20 to the seatbelt guide 14. As an example, the releasable post 20 may have one joint 64 connecting the releasable post 20 to one of the upper surface 40 of the seatbelt guide and the lower surface 42 of the seatbelt guide 14. As another example, the releasable post 20 may have two joints 64, one joint 64 connecting the releasable post 20 to the upper surface 40 of the seatbelt guide and the other joint 64 connecting the releasable post 20 to the lower surface 42 of the seatbelt guide 14. The joint 64 may be frangible relative to the seatbelt guide 14. Additionally, the joint 64 may be frangible relative to the releasable post 20 such that a force applied to the releasable post 20 would cause a break at the joint 64.

The releasable post 20 is designed to release from the seatbelt guide 14 upon application of force above a threshold amount and/or in a predetermined direction to release the releasable post 20. For example, the releasable post 20 is designed to release from the seatbelt guide 14 when subjected to forces resulting from the vehicle 12 being involved in a vehicle impact. The forces on the webbing 18 resulting from the vehicle impact pull the webbing 18 in a vehicle-forward. The threshold amount of force may be, 300 pounds. The threshold amount is large enough such that the releasable post 20 does not release from the seatbelt guide 14 during normal operation of the vehicle 12, i.e., in the absence of a vehicle impact.

The releasable post 20 may be monolithic with the seatbelt guide 14, i.e. the releasable post 20 and the seatbelt guide 14 are formed together as a single unit, or the releasable post 20 and the seatbelt guide 14 may be separately formed and subsequently assembled together, e.g., by adhesive, welding, bonding, etc. The releasable post 20 may be of any suitable material, e.g., plastic or rubber and be of any suitable shape, such as a tube.

Figure 4B:
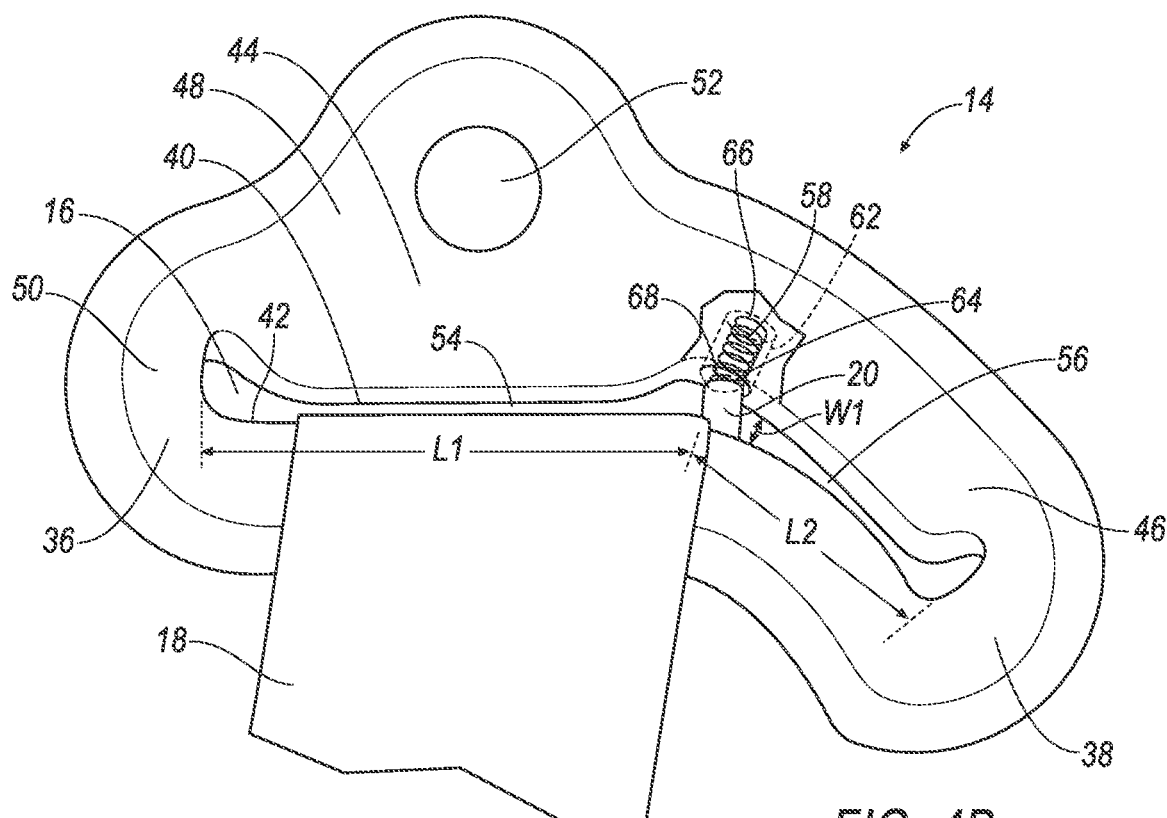
FIG. 4B is a perspective view of the seatbelt guide assembly including the webbing exerting force on the releasable post and the spring.
Figure 4C:
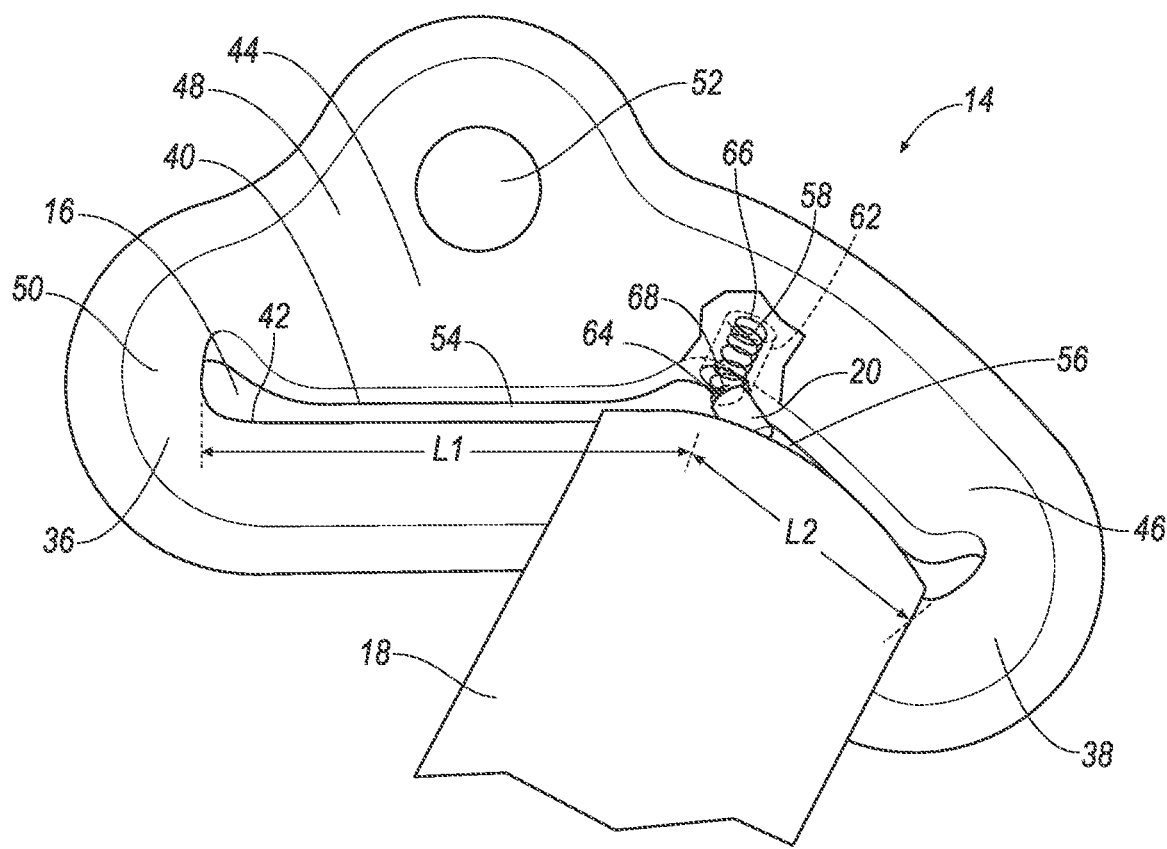
FIG. 4C is a perspective view of the seatbelt guide assembly including the webbing in the second position, the releasable post released and the spring.
Figure 5A:
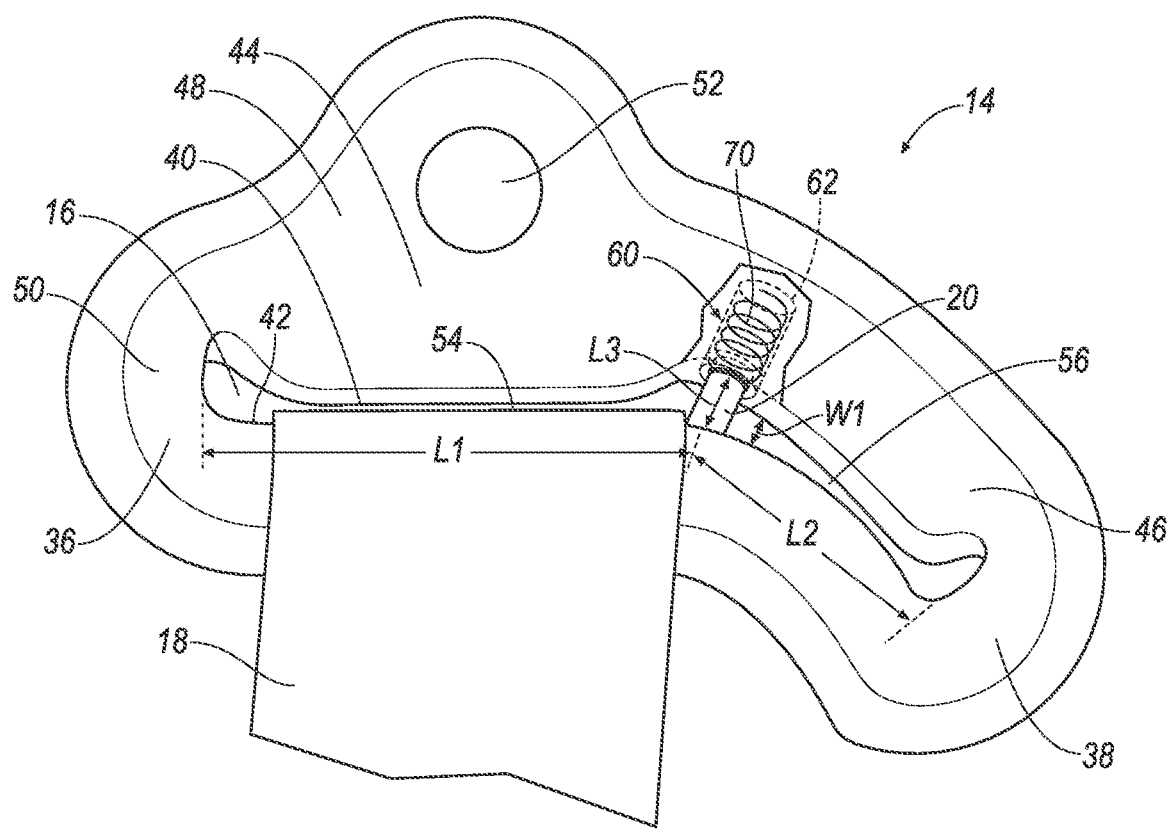
FIG. 5A is a perspective view of the seatbelt guide assembly including the webbing in the first position, the releasable post and a solenoid.
Figure 5B:
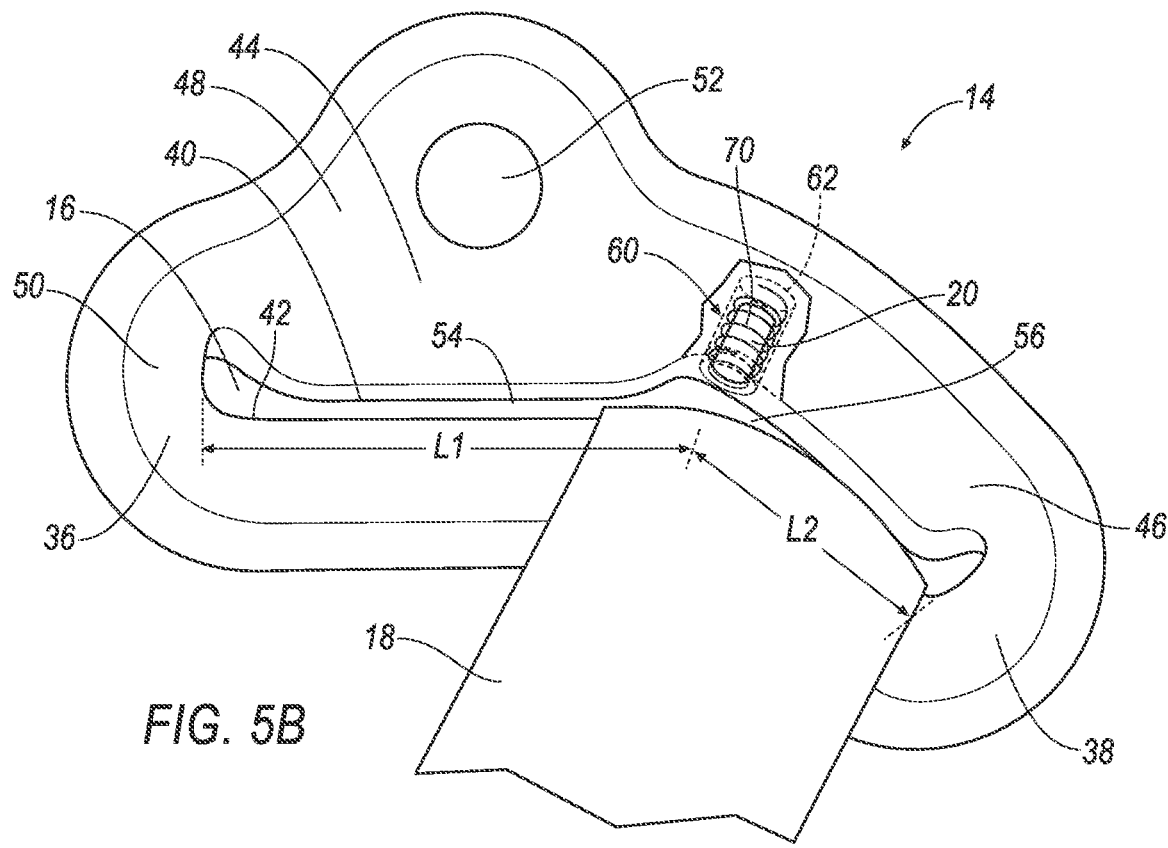
FIG. 5B is a perspective view of the seatbelt guide assembly including the webbing in the second position, the releasable post retracted and the solenoid.
Figure 6:
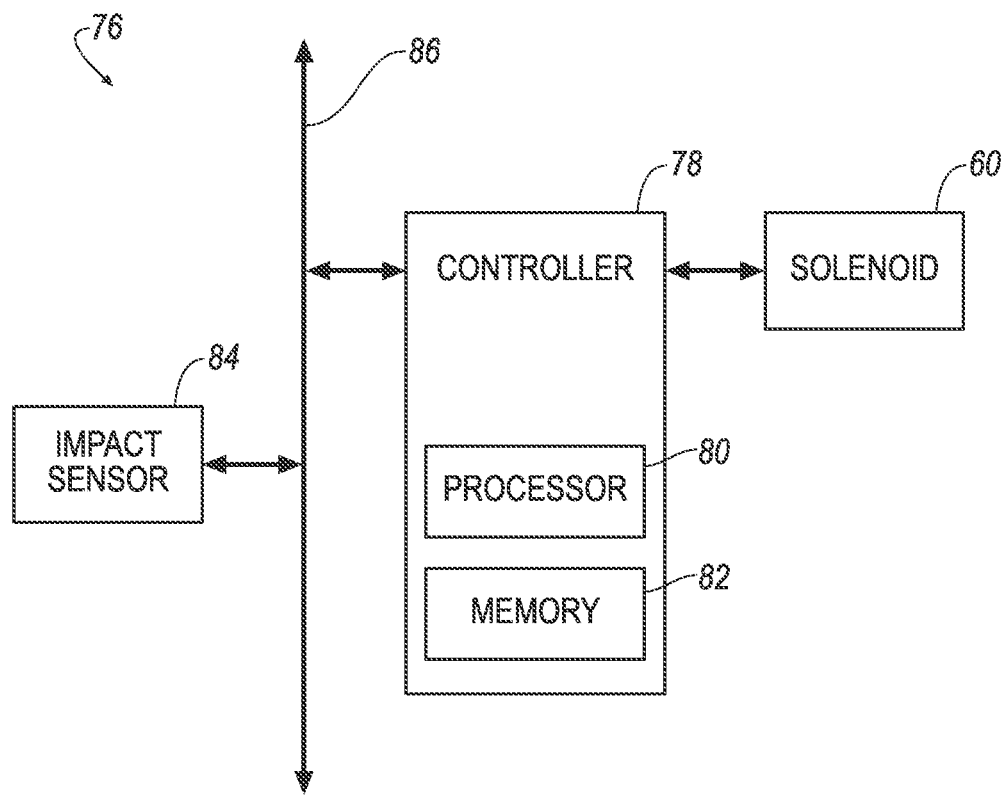
FIG. 6 illustrates an impact sensing system including the solenoid.

With reference to FIGS. 4A-4C, the assembly 10 may include a spring 58 between the seatbelt guide 14 and the releasable post 20. The spring 58 may be fixed to the upper surface 40 of the seatbelt guide 14 and biased against the releasable post 20. Additionally and/or alternatively, the spring 58 may be fixed to the lower surface 42 of the seatbelt guide 14.

The spring 58 has a first end 66 and a second end 68. As an example, and as shown in FIG. 4A, the spring 58 may be a coil spring with the first end 66 of the spring 58 fixed to the seatbelt guide 14 and the second end 68 of the spring 58 biased toward the releasable post 20. Alternatively, the spring 58 may be any suitable kind of spring. The spring 58 may be formed of metal, e.g., steel or aluminum, and the spring 58 may be fixed to the seatbelt guide 14 in any suitable fashion, e.g., with fasteners, welding, bonding, etc.

The second end 68 of the spring 58 may be in contact with the releasable post 20. The releasable post 20 may be between the spring 58 and the seatbelt guide 14. As an example, and as shown to FIG. 4A, the releasable post 20 may be between the spring 58 and the lower surface 42 of the seatbelt guide 14. In other words, the releasable post 20 may be in contact with the spring 58 and the lower surface 42 of the seatbelt guide 14. The spring 58 may bias the releasable post 20 against the lower surface 42 of the seatbelt guide 14. Alternatively, the releasable post 20 may be between the spring 58 and the upper surface 40 of the seatbelt guide 14. In other words, the releasable post 20 may be in contact with the spring 58 and the upper surface 40 of the seatbelt guide 14. The spring 58 may bias the releasable post 20 against the upper surface 40 of the seatbelt guide 14.

With reference to FIGS. 4A-4C and as previously mentioned, the seatbelt guide 14 may have the cavity 62. In one example, the cavity 62 may be sized to receive the spring 58. In another example, the cavity 62 may be sized to house the spring 58 and receive the releasable post 20.

The spring 58 may be housed in the cavity 62. The first end 66 of the spring 58 may be connected to the seatbelt guide 14 inside the cavity 62 and the second end 68 of the spring 58 may be connected to the releasable post 20.

With reference to FIG. 4A, the spring 58 biases the releasable post 20 away from the cavity 62. As an example, and as shown in FIG. 4A, the spring 58 being housed in the cavity 62 in the upper surface 40 of the seatbelt guide 14 may bias the releasable post 20 away from the cavity 62 and toward the lower surface 42 of the seatbelt guide 14. Alternatively, the spring 58 being housed in the cavity 62 in the lower surface 42 of the seatbelt guide 14 may bias the releasable post 20 away from the cavity 62 and toward the upper surface 40 of the seatbelt guide 14.

The releasable post 20 is designed to release from the seatbelt guide 14 upon application of force to the releasable post 20. The releasable post 20 may release by becoming dislodged upon the application of force, as shown. In other words, the webbing 18 biases the releasable post 20 against the spring 58, allowing the releasable post 20 to rotate relative to the seatbelt guide 14 and ultimately dislodging from the cavity 62.

With reference to FIGS. 5A-5B, the assembly 10 may include the solenoid 60. The solenoid 60 includes the releasable post 20 and retracts the releasable post 20 from the slot 16 when an impact of the vehicle 12 is detected. As one example, the solenoid 60 may retract the releasable post 20 in response to any sensed impact that biases the occupant in any vehicle-forward direction. As another example, the solenoid 70 may retract the releasable post 20 in response to only sensed impacts in a particular direction, e.g., oblique impact. The solenoid 60 may be supported by the seatbelt guide 14. Specifically, the cavity 62 in the seatbelt guide 14 may be sized to house the solenoid 60, and the seatbelt guide 14 may support the solenoid 60 by housing the solenoid 60 in the cavity 62.

The solenoid 60 may be an electromechanical solenoid. The solenoid 60 may include an electromagnetically inductive coil 70 and the releasable post 20. The releasable post 20 may be operatively coupled to the electromagnetically inductive coil 70. The releasable post 20 may be formed of any suitable magnetic material such as steel. Wires (not shown) of the solenoid 60 may be routed through the seatbelt guide 14.

The assembly 10 may include a processor 80 and a memory 82 storing program instructions executable by the processor 80 to actuate the solenoid 60 to retract the releasable post 20 relative to the slot 16 as a result of a detection of a vehicle impact. In other words, the processor 80 provides an electrical signal to the solenoid 60, which retracts the releasable post 20 into the cavity 62 upon the detection of a vehicle impact. As one example, the processor 80 may be programmed to retract the releasable post 20 in response to any sensed impact that biases the occupant in any vehicle-forward direction. As another example, the processor 80 may be programmed to retract the releasable post 20 in response to only sensed impacts in a particular direction, e.g., oblique impact.

With reference to the Figures, the assembly 10 includes the webbing 18. The webbing 18 may be formed of fabric in the shape of a strap. The webbing 18 extends through the slot 16 and the webbing 18 is slidable within the slot 16 from the first position in the first segment 54 to the second position in the second segment 56.

The vehicle 12 may include an impact sensing system 76. The impact sensing system 76 may include impact sensors 84 and a controller 78. The controller 78 is in communication with the solenoid 60 and may include the processor 80 and the memory 82. As previously mentioned, the memory 82 stores instructions executable by the processor 80 to control the solenoid 60. In one example, the controller 78 may be programmed to, upon identification of a vehicle impact, activate the solenoid 60, causing the releasable post 20 to retract into the cavity 62.

The impact sensors 84 may be configured to detect an impact to the vehicle 12. For example, post-contact sensors such as accelerometers, pressure sensors, and contact switches; and pre-impact sensors such as radar, LIDAR, and vision-sensing systems may be used to detect impact. The vision systems may include one or more cameras, CCD image sensors, CMOS image sensors, etc. The impact sensors 84 may be located at numerous points in or on the vehicle 12.

The controller 78 and the impact sensors 84 may be connected to a communication bus 86, such as a controller area network (CAN) bus, of the vehicle 12. The controller 78 may use information from the communication bus 86 to control the solenoid 60. The solenoid 60 may be connected directly to the controller 78, or the solenoid 60 may be connected via the communication bus 86.

The controller 78 may be a microprocessor-based computer, implemented via circuits, chips, or other electronic components. For example, the controller 78 may include the processor 80, the memory 82, etc. The memory 82 of the controller 78 may include memory 82 for storing programming instructions executable by the processor 80 as well as for electronically storing data and/or databases.

The controller 78 may store instructions executable by the processor 80 to actuate the solenoid 60 to retract the releasable post 20 relative to the slot 16 upon detecting a vehicle impact. For example, the controller 78 may receive information from the impact sensors 84, e.g., via the communication bus 86, indicating that a vehicle impact has been detected. Upon receiving such information, the controller 78 may transmit an instruction to the solenoid 60 to retract the releasable post 20 relative to the slot 16.

In normal operation of the vehicle 12, the webbing 18 is in the first position, as shown in FIG. 5A and the releasable post 20 extends across the slot 16, separating the first segment 54 from the second segment 56. In the event of a vehicle impact, the impact sensors 84 may detect the impact and transmit a signal through the communication bus 86 to the controller 78. Next, the controller 78 may transmit a signal to the solenoid 60. Upon receiving the signal, the solenoid 60 may actuate and retract the releasable post 20 into the cavity 62, as shown in FIG. 5B. With the releasable post 20 in the cavity 62, the webbing 18 is free to slide from the first position to the second position, lessening the compressive force of the webbing 18 on the occupant bearing forward.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a seatbelt guide including a slot;
a webbing extending through the slot; and
a releasable post supported by the seatbelt guide and extending across the slot;
wherein the slot has a first segment and a second segment, wherein the releasable post separates the first segment of the slot from the second segment of the slot, and wherein the first segment of the slot and the second segment of the slot are elongated from the releasable post; and
wherein the releasable post is frangible relative to the seatbelt guide.

2. The assembly as set forth in claim 1, wherein the releasable post has a joint connecting the releasable post to the seatbelt guide and the joint is frangible relative to the seatbelt guide.

3. The assembly as set forth in claim 1, wherein the releasable post and the seatbelt guide are monolithic.

4. The assembly as set forth in claim 1, wherein the first segment of the slot is elongated along a first axis, and the second segment of the slot is elongated along a second axis transverse to the first axis.

5. The assembly as set forth in claim 4, wherein the second axis extends from the first axis in a vehicle-inboard direction.

6. The assembly as set forth in claim 4, wherein the second axis extends from the first axis in a downward direction.

7. The assembly as set forth in claim 6, wherein the second axis extends from the first axis in a vehicle-inboard direction.

8. The assembly as set forth in claim 4, wherein the seatbelt guide has a first portion defining the first segment of the slot and extending along the first axis, and a second portion defining the second segment of the slot and extending along the second axis.

9. An assembly comprising:
a seatbelt guide including a slot;
a webbing extending through the slot;
a releasable post supported by the seatbelt guide and extending across the slot; and
a spring between the seatbelt guide and the releasable post;
wherein the seatbelt guide has a cavity housing the spring.

10. The assembly as set forth in claim 9, wherein the spring biases the releasable post away from the cavity.

11. The assembly as set forth in claim 9, wherein the releasable post is retractable into the cavity.

12. The assembly as set forth in claim 9, wherein the slot has a first segment elongated along a first axis and a second segment elongated along a second axis transverse to the first axis.

13. The assembly as set forth in claim 12, wherein the second axis extends from the first axis in a vehicle-inboard direction.

14. The assembly as set forth in claim 12, wherein the second axis extends from the first axis in a downward direction.

15. The assembly as set forth in claim 14, wherein the second axis extends from the first axis in a vehicle-inboard direction.

16. The assembly as set forth in claim 12, wherein the seatbelt guide has a first portion defining the first segment of the slot and extending along the first axis, and a second portion defining the second segment of the slot and extending along the second axis.

17. An assembly comprising:
a seatbelt guide including a slot;
a webbing extending through the slot;
a releasable post supported by the seatbelt guide and extending across the slot; and
a solenoid supported by the seatbelt guide, the solenoid including the releasable post.

18. The assembly as set forth in claim 17, further comprising a processor and a memory storing program instructions executable by the processor to actuate the solenoid to retract the releasable post relative to the slot as a result of a detection of an oblique impact.

19. The assembly as set forth in claim 17, wherein the slot includes a first segment elongated along a first axis and a second segment elongated along a second axis transverse to the first axis.

20. The assembly as set forth in claim 19, wherein the second axis extends from the first axis in a vehicle-inboard direction.

21. The assembly as set forth in claim 19, wherein the second axis extends from the first axis in a downward direction.

22. The assembly as set forth in claim 21, wherein the second axis extends from the first axis in a vehicle-inboard direction.

23. The assembly as set forth in claim 19, wherein the seatbelt guide has a first portion defining the first segment of the slot and extending along the first axis, and a second portion defining the second segment of the slot and extending along the second axis.

* * * * *